(12) United States Patent
Wang et al.

(10) Patent No.: US 12,065,241 B2
(45) Date of Patent: Aug. 20, 2024

(54) UNMANNED AERIAL VEHICLE

(71) Applicant: AUTEL ROBOTICS CO., LTD., Guangdong (CN)

(72) Inventors: Shenglong Wang, Guangdong (CN); Maxwell Lee, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 182 days.

(21) Appl. No.: 17/660,251

(22) Filed: Apr. 22, 2022

(65) Prior Publication Data
US 2022/0242563 A1 Aug. 4, 2022

Related U.S. Application Data

(63) Continuation of application No. PCT/CN2020/123312, filed on Oct. 23, 2020.

(30) Foreign Application Priority Data

Oct. 23, 2019 (CN) .......................... 201911013306.X

(51) Int. Cl.
*B64C 39/02* (2023.01)
*B64C 1/06* (2006.01)
(Continued)

(52) U.S. Cl.
CPC ............ *B64C 39/024* (2013.01); *B64C 1/061* (2013.01); *B64C 1/16* (2013.01); *B64U 10/20* (2023.01); *B64U 30/14* (2023.01)

(58) Field of Classification Search
CPC .................................. B64U 30/14; B64C 1/069
(Continued)

(56) References Cited

U.S. PATENT DOCUMENTS 3,161,373 A * 12/1964 Vogt .................... B64D 5/00
244/2
3,935,664 A * 2/1976 Neuhierl .............. A63H 27/001
446/61
(Continued)

FOREIGN PATENT DOCUMENTS

CA 2815850 A1 * 11/2014 .......... B64C 39/024
CN 109808868 A 5/2019
(Continued)

OTHER PUBLICATIONS

PCT International Search Report mailed Jan. 26, 2021; PCT/CN2020/123312 with English Translation.

*Primary Examiner* — Christopher P Ellis
(74) *Attorney, Agent, or Firm* — Frank Gao, Esq.

(57) ABSTRACT

The embodiment is an unmanned aerial vehicle. The unmanned aerial vehicle includes: an airframe, including first mounting portions, where the first mounting portion includes a first mounting body and connecting rods formed on the first mounting body, the connecting rods extending in a pitch axis direction; and a power assembly, including a first assembling body and eccentric wheels mounted on the first assembling body, where the eccentric wheel is rotatable between a first rotation position and a second rotation position of the first assembling body around a rotation axis of the first assembling body, the rotation axis being perpendicular to the pitch axis direction.

13 Claims, 9 Drawing Sheets

(51) Int. Cl.
*B64C 1/16* (2006.01)
*B64U 10/20* (2023.01)
*B64U 30/14* (2023.01)

(58) Field of Classification Search
USPC ............................................................ 244/124
See application file for complete search history.

(56) References Cited

U.S. PATENT DOCUMENTS

| | | | |
|---|---|---|---|
| 11,096,491 B2* | 8/2021 | Pyle | A47B 95/008 |
| 11,148,781 B2* | 10/2021 | Sartorius | B64C 1/26 |
| 2006/0091258 A1* | 5/2006 | Chiu | B64U 20/40 |
| | | | 244/119 |
| 2015/0014482 A1* | 1/2015 | Weierman | B64U 50/31 |
| | | | 244/124 |
| 2015/0053843 A1* | 2/2015 | Tayne | F16B 43/003 |
| | | | 248/678 |
| 2016/0272298 A1* | 9/2016 | Thompson | B64C 3/38 |
| 2017/0349281 A1* | 12/2017 | Quinlan | B64D 5/00 |
| 2018/0057136 A1* | 3/2018 | Haley | A63H 27/001 |
| 2019/0003511 A1* | 1/2019 | Leon | F16B 41/002 |
| 2019/0084664 A1* | 3/2019 | Nesti | B64D 5/00 |
| 2019/0168872 A1* | 6/2019 | Grubb | B64C 39/024 |
| 2020/0070973 A1* | 3/2020 | Grubb | B64C 25/68 |
| 2020/0172236 A1* | 6/2020 | George | B64F 1/362 |
| 2023/0039018 A1* | 2/2023 | Rysdyk | B64C 25/68 |

FOREIGN PATENT DOCUMENTS

| | | | | |
|---|---|---|---|---|
| CN | 208897306 U | | 5/2019 | |
| CN | 110615096 A | | 12/2019 | |
| CN | 110615097 A | | 12/2019 | |
| CN | 110775248 A | | 2/2020 | |
| CN | 217836006 U | * | 11/2022 | ............ B64C 1/26 |
| KR | 101776949 B1 | * | 11/2019 | |
| KR | 101988428 B1 | * | 11/2020 | |

* cited by examiner

UNMANNED AERIAL VEHICLE

CROSS-REFERENCE TO RELATED APPLICATIONS

The present application is a continuation of International Application No. PCT/CN2020/123312, filed on Oct. 23, 2020, which claims priority to Chinese patent application No. 201911013306.X, filed on Oct. 23, 2019, which is incorporated herein by reference in its entirety.

TECHNICAL FIELD

The present application relates to the field of unmanned aerial vehicles, and in particular, to an unmanned aerial vehicle.

BACKGROUND

In the field of unmanned aerial vehicles, a power assembly of an unmanned aerial vehicle needs to be changed in different working environments.

However, in existing unmanned aerial vehicles, an airframe and a power assembly are usually in a fixed connection or a bolted connection. As a result, the power assembly cannot be detached or may be detached inconveniently.

SUMMARY

To resolve the foregoing technical problems, embodiments of the present application provide an unmanned aerial vehicle in which a power assembly can be conveniently detached from an airframe.

To resolve the foregoing technical problems, the embodiments of the present application provide the following technical solutions:

An unmanned aerial vehicle is provided. The unmanned aerial vehicle includes: an airframe, including first mounting portions, where the first mounting portion includes a first mounting body and connecting rods formed on the first mounting body, the connecting rods extending in a pitch axis direction; and a power assembly, including a first assembling body and eccentric wheels mounted on the first assembling body, where the eccentric wheel is rotatable between a first rotation position and a second rotation position of the first assembling body around a rotation axis of the first assembling body, the rotation axis being perpendicular to the pitch axis direction. The connecting rod is insertable into the eccentric wheel in the pitch axis direction when the eccentric wheel is rotated to the first rotation position; and the connecting rod is non-retreatable from the eccentric wheel in the pitch axis direction when the eccentric wheel is rotated to the second rotation position and the connecting rod is inserted into the eccentric wheel.

In some embodiments, the first mounting body includes a first mounting surface, the connecting rods being formed on the first mounting surface; the first assembling body includes a first assembling surface and a first side surface that are connected to each other, where the first assembling surface is configured to be attached to the first mounting surface and connecting holes are formed on the first assembling surface, the connecting holes being configured to be inserted by the connecting rods; and rotating holes are formed on the first side surface, the rotating holes including a rotation axis and being in communication with the connecting holes; and the eccentric wheel is mounted in the rotating hole.

In some embodiments, the connecting rod includes a rod body and a limiting body; the rod body extends in the pitch axis direction, the limiting body is connected to an end of the rod body far away from the first mounting body and a cross-section size of the rod body is less than a cross-section size of the limiting body; the eccentric wheel includes a rotating wheel, where a cavity is formed in the rotating wheel and the rotating wheel includes a cylindrical surface disposed around the rotation axis, the cylindrical surface being sleeved on a hole wall of the rotating hole; and an arc-shaped guide groove and an avoidance groove are formed on the cylindrical surface, the arc-shaped guide groove being in communication with the cavity and provided around the rotation axis, the arc-shaped guide groove including a first end and a second end, the avoidance groove being in communication with the cavity and the first end; when the eccentric wheel is rotated to the first rotation position, the avoidance groove is aligned with the connecting hole and the limiting body is accommodatable in the cavity through the connecting hole in the pitch axis direction; and when the eccentric wheel is rotated to the second rotation position and the limiting body is accommodated in the cavity, the second end is aligned with the connecting hole and the limiting body is non-retreatable from the cavity through the arc-shaped guide groove in the pitch axis direction.

In some embodiments, the limiting body is spherical.

In some embodiments, the first assembling body further includes a second side surface, the first side surface being opposite to the second side surface, the first assembling surface being connected between the first side surface and the second side surface; the rotating hole extends from the first side surface to the second side surface and an opening of the rotating hole on the second side surface is closed by a closure plate, the closure plate being detachably connected to the second side surface; and the hole wall of the rotating hole includes an annular stopper portion protruding close to the first side surface, the annular stopper portion being disposed around the rotation axis.

In some embodiments, the rotating wheel further includes a first end surface and a second end surface opposite to each other, the cylindrical surface being connected between the first end surface and the second end surface, the first end surface abutting against the annular stopper portion and the second end surface abutting against the closure plate.

In some embodiments, the eccentric wheel further includes a boss; and the boss is formed in the center of the first end surface and is exposed from the rotating hole, a groove configured to be screwed by a screwdriver being formed on a surface of the boss facing away from the first end surface.

In some embodiments, an arc-shaped bump is formed on the annular stopper portion toward the first end surface; the eccentric wheel further includes an interference portion, the interference portion being formed on the boss in a direction perpendicular to the rotation axis; the first end surface abuts against the annular stopper portion by using the arc-shaped bump; the interference portion abuts against an end of the arc-shaped bump when the eccentric wheel is rotated to the first rotation position; and the interference portion abuts against an other end of the arc-shaped bump when the eccentric wheel is rotated to the second rotation position.

In some embodiments, a positioning beam is further formed on the first mounting surface, the positioning beam extending in the pitch axis direction; and a positioning hole is further formed on the first assembling surface, the positioning hole being configured to be inserted by the positioning beam.

In some embodiments, a cross-section of the positioning beam is non-circular.

In some embodiments, the cross-section of the positioning beam is square.

In some embodiments, a first plug-connection terminal is disposed on the first mounting surface; and a second plug-connection terminal is disposed on the first assembling surface and is configured to be plug-connected to the first plug-connection terminal.

In some embodiments, the power assembly includes a fixed-wing assembly and a rotor assembly; the fixed-wing assembly and the rotor assembly are replaceably connected to the first mounting portion; the airframe and the fixed-wing assembly jointly form a vertical take-off and landing fixed-wing unmanned aerial vehicle when the fixed-wing assembly is connected to the first mounting portion; the airframe and the rotor assembly jointly form a multi-rotor unmanned aerial vehicle when the rotor assembly is connected to the first mounting portion; and either of the fixed-wing assembly and the rotor assembly includes the first assembling body and the eccentric wheels.

Compared with the prior art, in the unmanned aerial vehicle in the embodiments of the present application, eccentric wheels are disposed on the power assembly and connecting rods are disposed on the airframe, the connecting rod is insertable into the eccentric wheel in the pitch axis direction when the eccentric wheel is rotated to the first rotation position; and the connecting rod is non-retreatable from the eccentric wheel in the pitch axis direction when the eccentric wheel is rotated to the second rotation position and the connecting rod is inserted into the eccentric wheel, so that the connecting rod is locked. After the connecting rod is inserted into the eccentric wheel, the connecting rod may be locked only by rotating the eccentric wheel, thereby implementing the unmanned aerial vehicle in which the power assembly can be conveniently detached from the airframe.

BRIEF DESCRIPTION OF THE DRAWINGS

One or more embodiments are exemplarily described with reference to the corresponding figures in the accompanying drawings, and the exemplary descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

Figure 1:
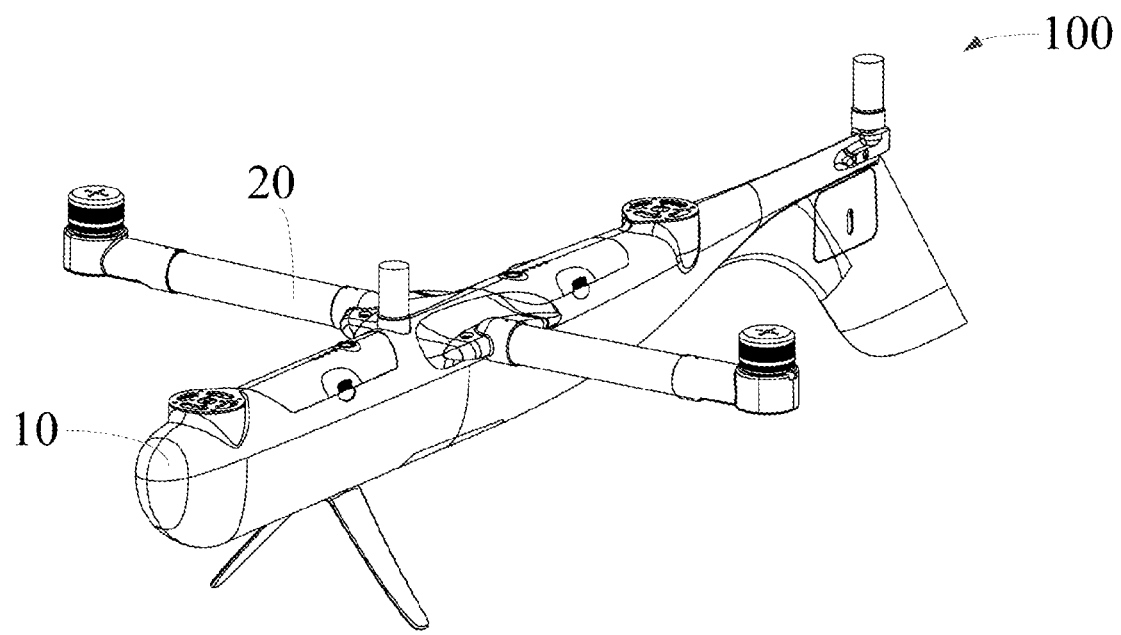
FIG. 1 is a schematic structural diagram of an unmanned aerial vehicle in a configuration of a multi-rotor unmanned aerial vehicle according to an embodiment of the present application.
Figure 2:
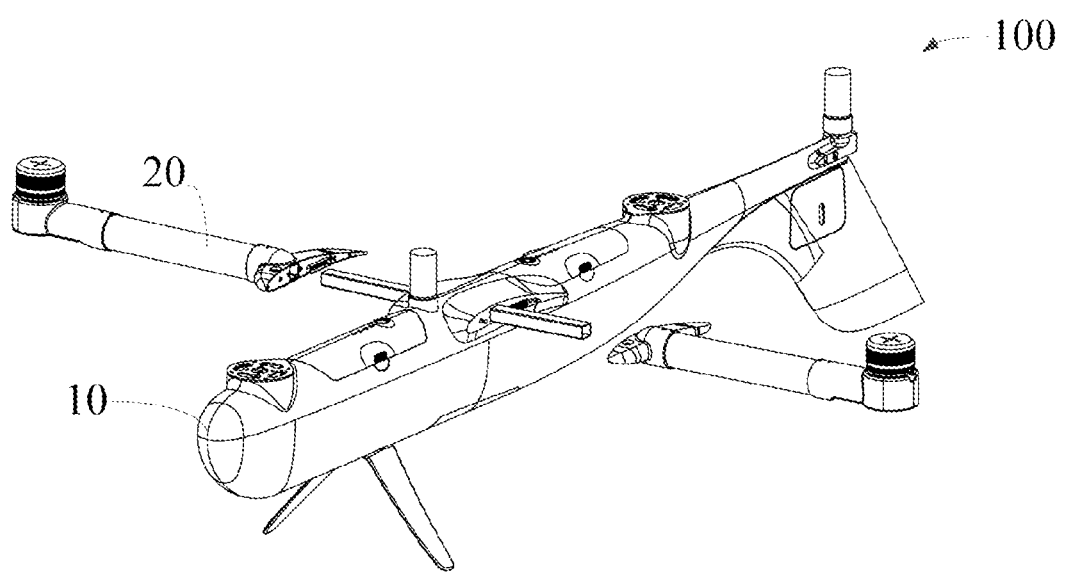
FIG. 2 is a schematic exploded view of the multi-rotor unmanned aerial vehicle shown in FIG. 1.

For ease of understanding of the present application, the present application is described below in more detail with reference to accompanying drawings and specific implementations. It should be noted that, when one component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", "inside", "outside" and similar expressions used in this specification are merely used for an illustrative purpose.

Unless otherwise defined, meanings of all technical and scientific terms used in this specification are the same as those usually understood by a person skilled in art of the present application. Terms used in this specification of the present application are merely intended to describe objectives of the specific implementations, and are not intended to limit the present application. A term "and/or" used in this specification includes any or all combinations of one or more related listed items.

FIG. 1 to FIG. 4 show an unmanned aerial vehicle 100 provided in an embodiment of the present application, which includes an airframe 10, a power assembly and a tail wing assembly 40. Both the power assembly and the tail wing assembly 40 are detachably connected to the airframe 10. The power assembly includes a rotor assembly 20 and a fixed-wing assembly 30. The rotor assembly 20 and the fixed-wing assembly 30 are replaceably connected to the airframe 10.

The rotor assembly 20 and the airframe 10 jointly form a multi-rotor unmanned aerial vehicle when the rotor assembly 20 is connected to the airframe 10. The multi-rotor unmanned aerial vehicle is shown in FIG. 1.

Figure 3:
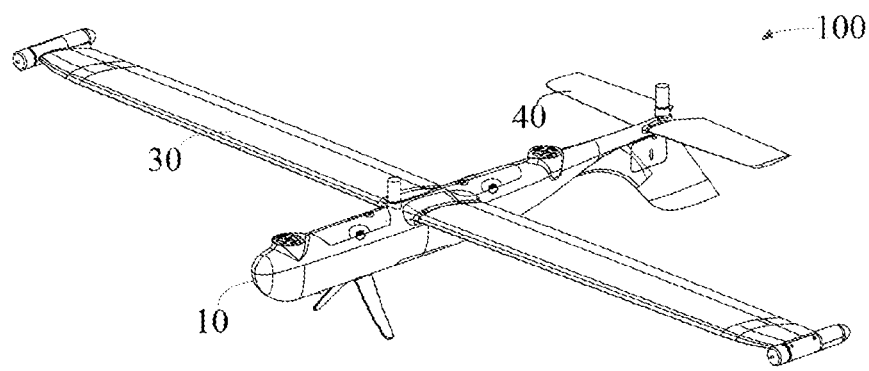
FIG. 3 is a schematic structural diagram of an unmanned aerial vehicle in a configuration of a vertical take-off and landing fixed-wing unmanned aerial vehicle according to an embodiment of the present application.
Figure 4:
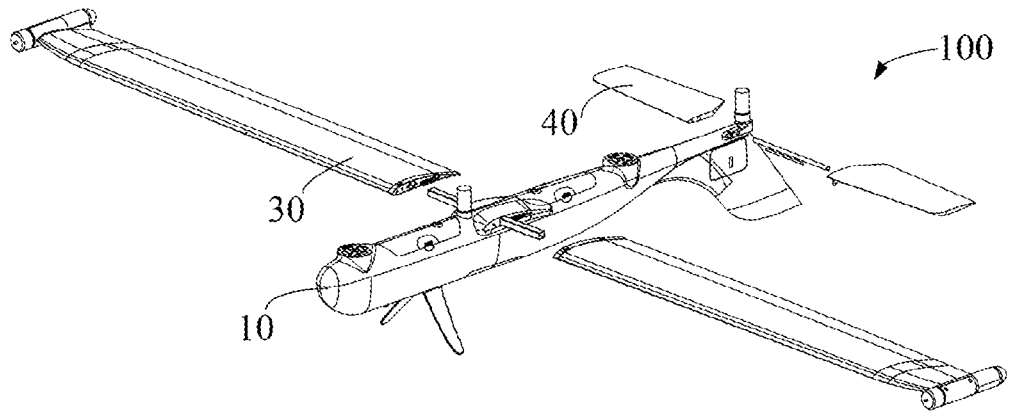
FIG. 4 is a schematic exploded view of the vertical take-off and landing fixed-wing unmanned aerial vehicle shown in FIG. 3.

The fixed-wing assembly 30, the tail wing assembly 40 and the airframe 10 jointly form a vertical take-off and landing fixed-wing unmanned aerial vehicle when both the fixed-wing assembly 30 and the tail wing assembly 40 are connected to the airframe 10. The vertical take-off and landing fixed-wing unmanned aerial vehicle is shown in FIG. 3.

Figure 5:
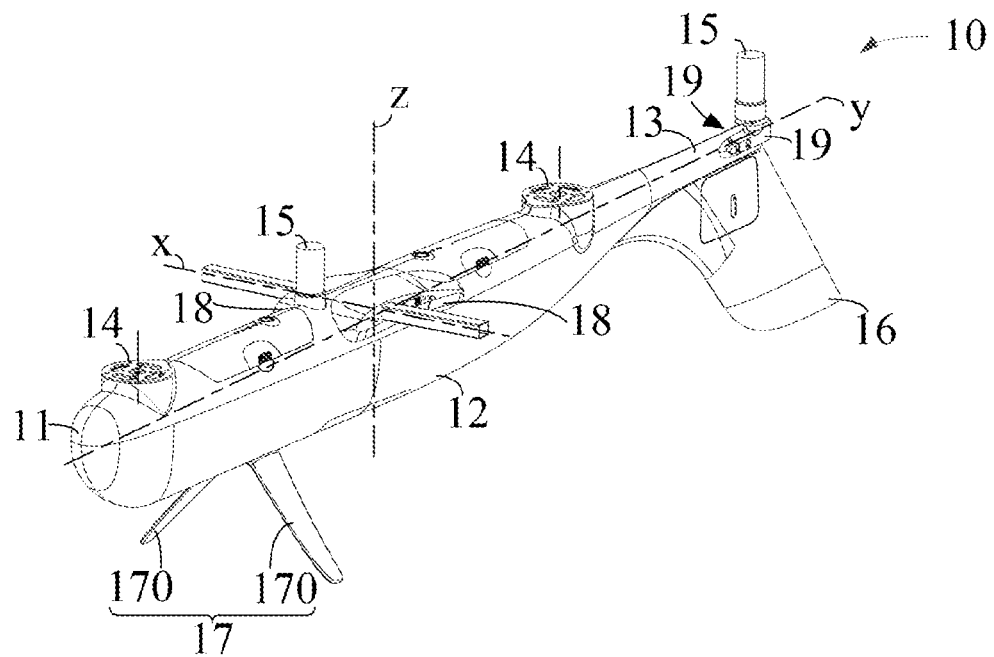
FIG. 5 is a schematic structural diagram of an airframe of the multi-rotor unmanned aerial vehicle shown in FIG. 1 or the vertical take-off and landing fixed-wing unmanned aerial vehicle shown in FIG. 3.

Referring to FIG. 5 together, the airframe 10 is strip-shaped in a roll axis direction y as a whole and includes a vehicle head 11, a vehicle body 12 and a vehicle tail 13 sequentially arranged in the roll axis direction y.

A circuit module (not shown in the figure) is configured in the airframe 10. The circuit module includes a circuit board and a plurality of electronic components mounted on the circuit board. The circuit module is mainly configured to control electronic devices disposed outside the airframe 10 and the rotor assembly 20 or the fixed-wing assembly 30 connected to the airframe 10.

The electronic devices disposed outside the airframe 10 include two first rotor motors 14 and two antennas 15. The two first rotor motors 14 and the two antennas 15 are all disposed on a same side of the airframe 10 in a yaw axis direction z of the airframe. One of the first rotor motors 14 is disposed on the vehicle head 11 or at a position on the vehicle body 12 close to the vehicle head 11. The other rotor motor 14 is disposed on the vehicle tail 13 or at a position on the vehicle body 12 close to the vehicle tail 13. The two first rotor motors 14 are configured to jointly provide lift. A rotary shaft of each first rotor motor 14 is disposed in the yaw axis direction z and a first propeller (not shown in the figure) is mounted on the rotary shaft.

It may be understood that a quantity of first rotor motors is not limited to 2, which may be set according to an actual condition. For example, the quantity of first rotor motors may be smaller if the airframe has less load or the airframe is lighter; and the quantity of first rotor motors may be larger if the airframe has more load or the airframe is heavier.

The two first rotor motors 14 and the two antennas 15 are all arranged in the roll axis direction y. The antennas 15 and the first rotor motors 14 are disposed alternately. The two antennas 15 are configured to jointly perform navigation and positioning for the unmanned aerial vehicle. Each antenna 15 may be a real-time kinematic (RTK) antenna.

It may be understood that, a quantity of antennas is not limited to 2, which may be more or less according to an actual condition.

A lower vertical stabilizer 16, a landing gear 17, two first mounting portions 18 and two second mounting portions 19 are further disposed outside the airframe 10. Both the lower vertical stabilizer 16 and the landing gear 17 are disposed on an other side of the airframe 10 facing away from the two first rotor motors 14 in the yaw axis direction z of the airframe. The lower vertical stabilizer 16 is disposed at the vehicle tail 13. The landing gear 17 is disposed at the vehicle body 12. The landing gear 17 includes two support portions 170. The two support portions 170 are inversely splayed and configured to support the airframe 10 together with the lower vertical stabilizer 16.

The two first mounting portions 18 are respectively disposed on two sides of the vehicle body 12 in a pitch axis direction x of the vehicle body.

The two second mounting portions 19 are respectively disposed on two sides of the vehicle tail 13 in a pitch axis direction x of the vehicle tail.

Figure 6:
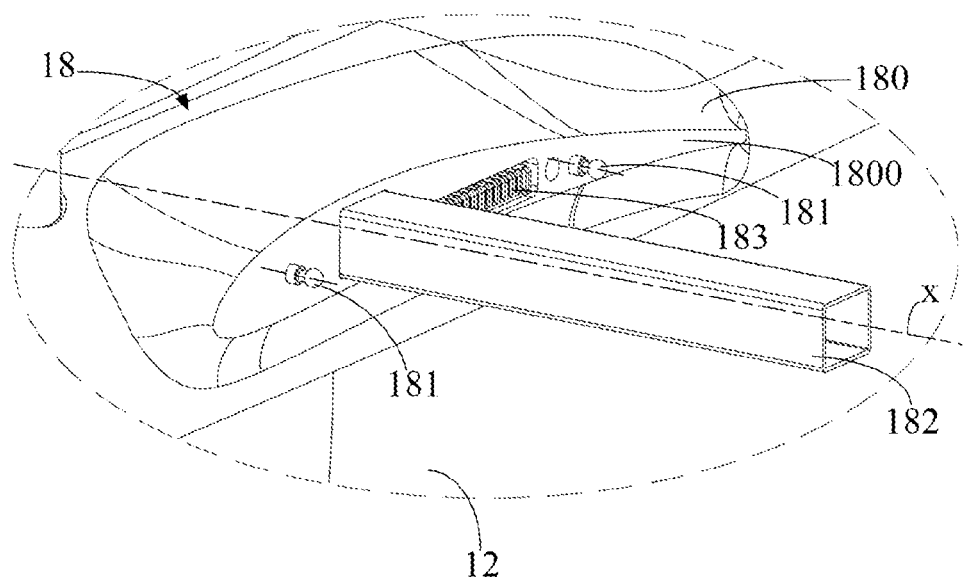
FIG. 6 is a first partial view of the airframe shown in FIG. 5, which mainly shows one first mounting portion of the airframe.

Referring to FIG. 6 together, one of the first mounting portions 18 is used as an example. The first mounting portion 18 includes a first mounting body 180, two connecting rods 181, a positioning beam 182 and a first plug-connection terminal 183. The first mounting body 180 is disposed on a side of the vehicle body 12 in the pitch axis direction x of the vehicle body and includes a first mounting surface 1800. The first mounting surface 1800 is disposed facing away from the vehicle body 12. The two connecting rods 181, the positioning beam 182 and the first plug-connection terminal 183 are all formed on the first mounting surface 1800. Each connecting rod 181 extends in the pitch axis direction x. The positioning beam 182 extends in the pitch axis direction x and has a hollow square cross-section. According to an actual condition, a cross-section of the positioning beam may alternatively be designed into any other non-circular shape such as an ellipse, a triangle or a pentagon. The first plug-connection terminal 183 is electrically connected to the circuit module.

Figure 7:
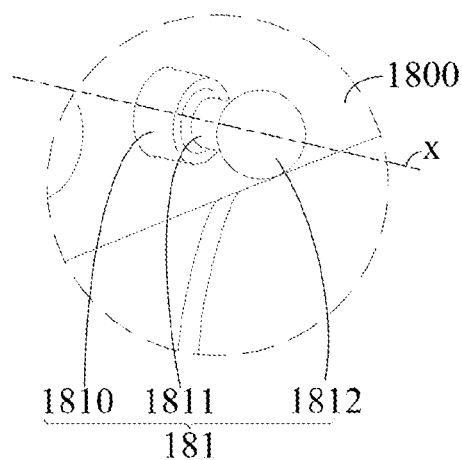
FIG. 7 is a partial view of the first mounting portion shown in FIG. 5, which mainly shows one connecting rod of the first mounting portion.

Referring to FIG. 7 together, one of the connecting rods 181 is used as an example. The connecting rod 181 includes a base 1810, a rod body 1811 and a limiting body 1812. The base 1810 is formed on the first mounting surface 1800. The rod body 1811 extends in the pitch axis direction x and has one end connected to the base 1810 and an other end connected to the limiting body 1812. A cross-section size of the rod body 1811 is less than a cross-section size of the limiting body 1812. In this embodiment, the limiting body 1812 is spherical. According to an actual condition, the limiting body 1812 may be in any shape as long as the cross-section size of the limiting body is greater than the cross-section size of the rod body 1811.

Figure 8:
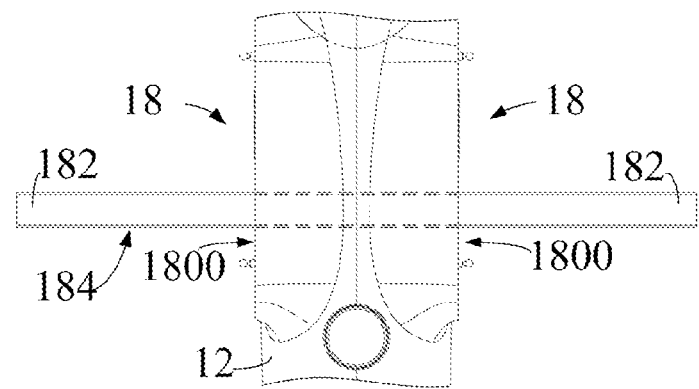
FIG. 8 is a second partial view of the airframe shown in FIG. 6, which mainly shows two first mounting portions of the airframe.

In this embodiment, referring to FIG. 8 together, a cross beam 184 passes through first mounting surfaces 1800 of two first mounting portions 18. Positioning beams 182 of the two first mounting portions 18 are respectively formed at two ends of the cross beam 184. In some other embodiments, the positioning beams 182 and the first mounting body 180 may alternatively be integrally formed.

Figure 9:
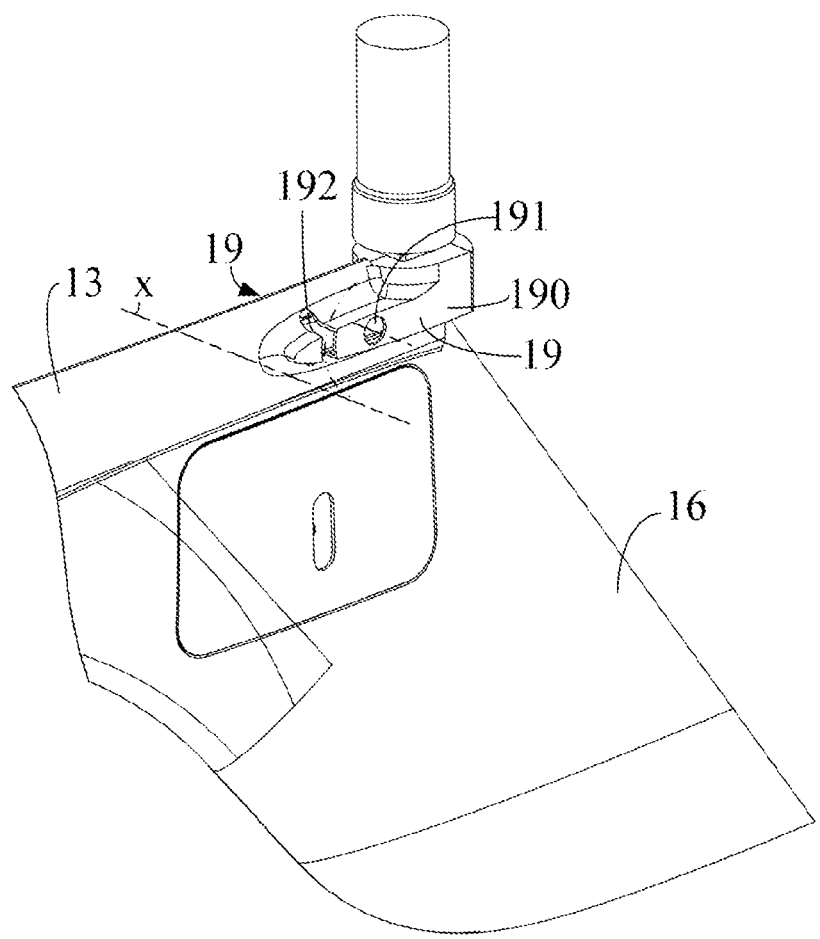
FIG. 9 is a third partial view of the airframe shown in FIG. 5, which mainly shows one second mounting portion of the airframe.
Figure 10:
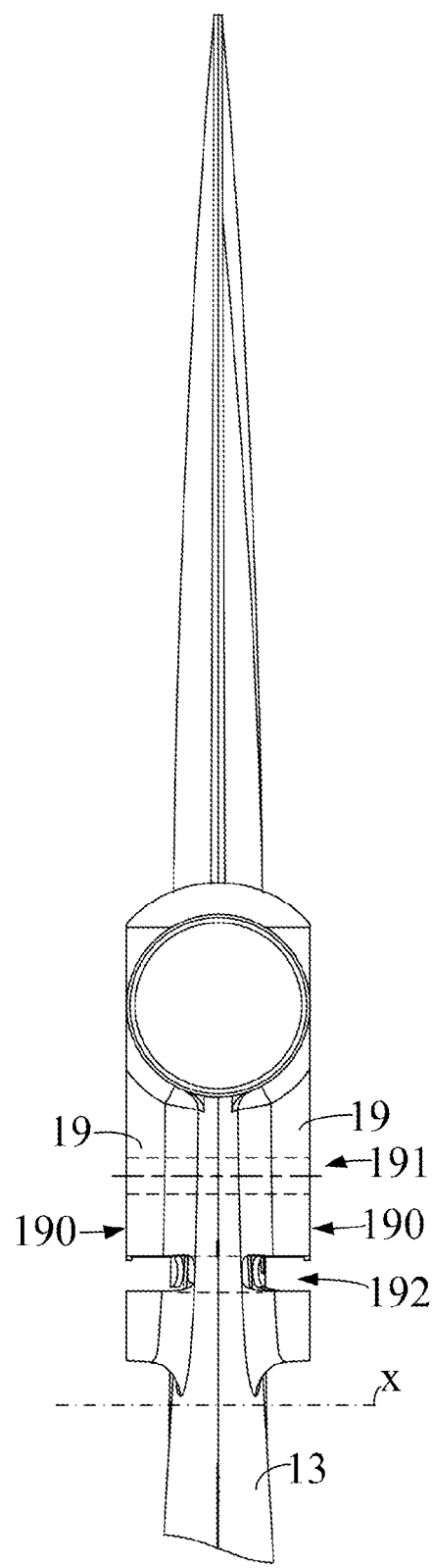
FIG. 10 is a fourth partial view of the airframe shown in FIG. 8, which mainly shows two second mounting portions of the airframe.

Referring to FIG. 9 and FIG. 10 together, each second mounting portion 19 includes a second mounting surface 190. The second mounting surface 190 is disposed facing away from the vehicle tail 13. A shaft hole 191 and an arc-shaped guide hole 192 are jointly formed on two second mounting portions 19. Both the shaft hole 191 and the arc-shaped guide hole 192 pass through the second mounting surfaces 190 of the two second mounting portions 19. Both the shaft hole 191 and the arc-shaped guide hole 192 extend in the pitch axis direction x. The arc-shaped guide hole 192 is provided around the shaft hole 191.

Figure 11:
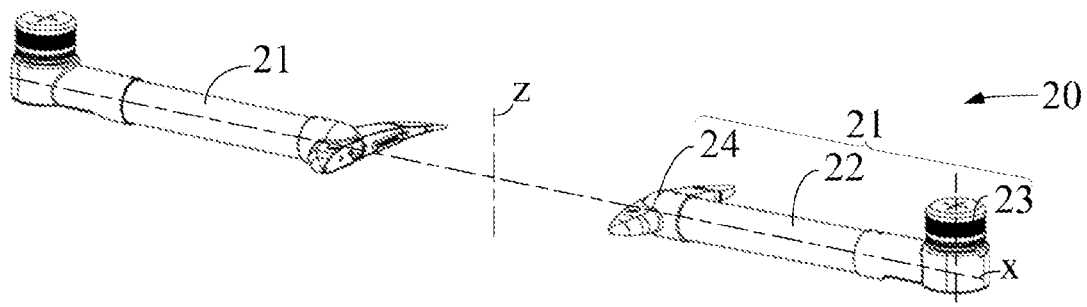
FIG. 11 is a schematic structural diagram of a rotor assembly of the multi-rotor unmanned aerial vehicle shown in FIG. 2.

Referring to FIG. 11 together, the rotor assembly 20 includes arm components 21. A quantity of arm components 21 corresponds to a quantity of first mounting portions 18. Each arm component 21 is configured to be connected to a corresponding first mounting portion 18. Using one of the arm components 21 as an example, the arm component 21 includes an arm body 22, a second rotor motor 23 and a first assembling portion 24. The arm body 22 extends in the pitch axis direction x. One end of the arm body 22 is connected to the second rotor motor 23 and an other end of the arm body 22 is connected to the first assembling portion 24. The arm body 22 is hollow for wiring of the second rotor motor 23, to electrically connect the second rotor motor 23 to the first assembling portion 24. A rotary shaft of the second rotor motor 23 is disposed in the yaw axis direction z and a second propeller (not shown in the figure) is mounted on the rotary shaft. The second rotor motor 23 is configured to provide lift.

Figure 12:
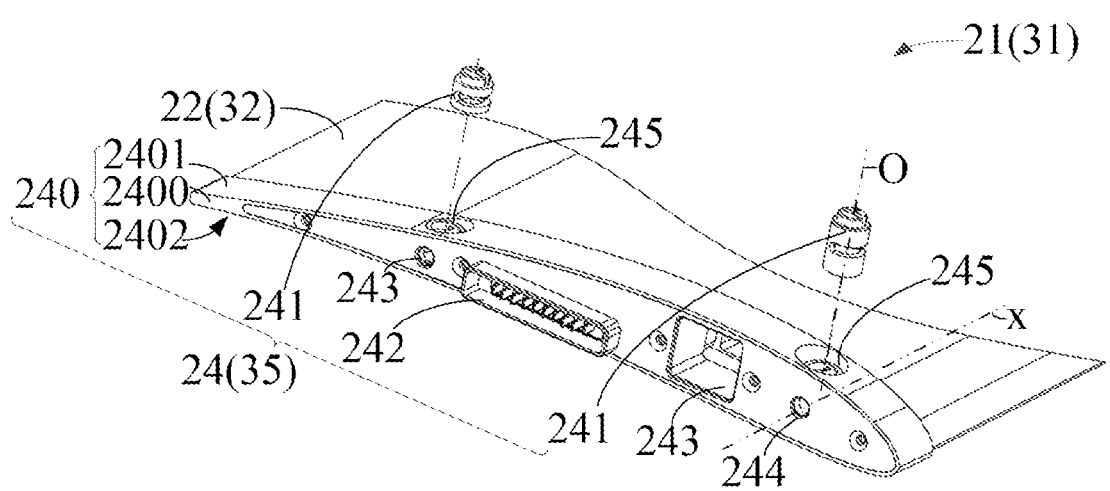
FIG. 12 is a partial view of one arm component of the rotor assembly shown in FIG. 11, which mainly shows a first assembling portion of the arm component.

Referring to FIG. 12 together, the first assembling portion 24 is configured to be connected to a corresponding first mounting portion 18. The first assembling portion 24 includes an first assembling body 240, eccentric wheels 241 and a second plug-connection terminal 242. The first assembling body 240 includes a first assembling surface 2400, a first side surface 2401 and a second side surface 2402. The first side surface 2401 is opposite to the second side surface 2402. The first assembling surface 2400 is connected between the first side surface 2401 and the second side surface 2402. The first assembling surface 2400 is configured to be attached to the first mounting surface 1800 of the first mounting portion 18. Positioning holes 243 and connecting holes 244 are formed on the first assembling surface 2400. The positioning holes 243 match the positioning beam 182 of the first mounting portion 18 and are configured to be inserted by the positioning beam 182. A quantity of connecting holes 244 corresponds to a quantity of connecting rods 181. Each connecting hole 244 is configured to be inserted by a corresponding connecting rod 181. Rotating holes 245 are formed on the first side surface 2401. A quantity of rotating holes 245 corresponds to the quantity of connecting holes 244. The second plug-connection terminal 242 is disposed on the first assembling surface 2400. The second plug-connection terminal 242 of the arm component 21 is electrically connected to the second rotor motor 23.

Figure 13:
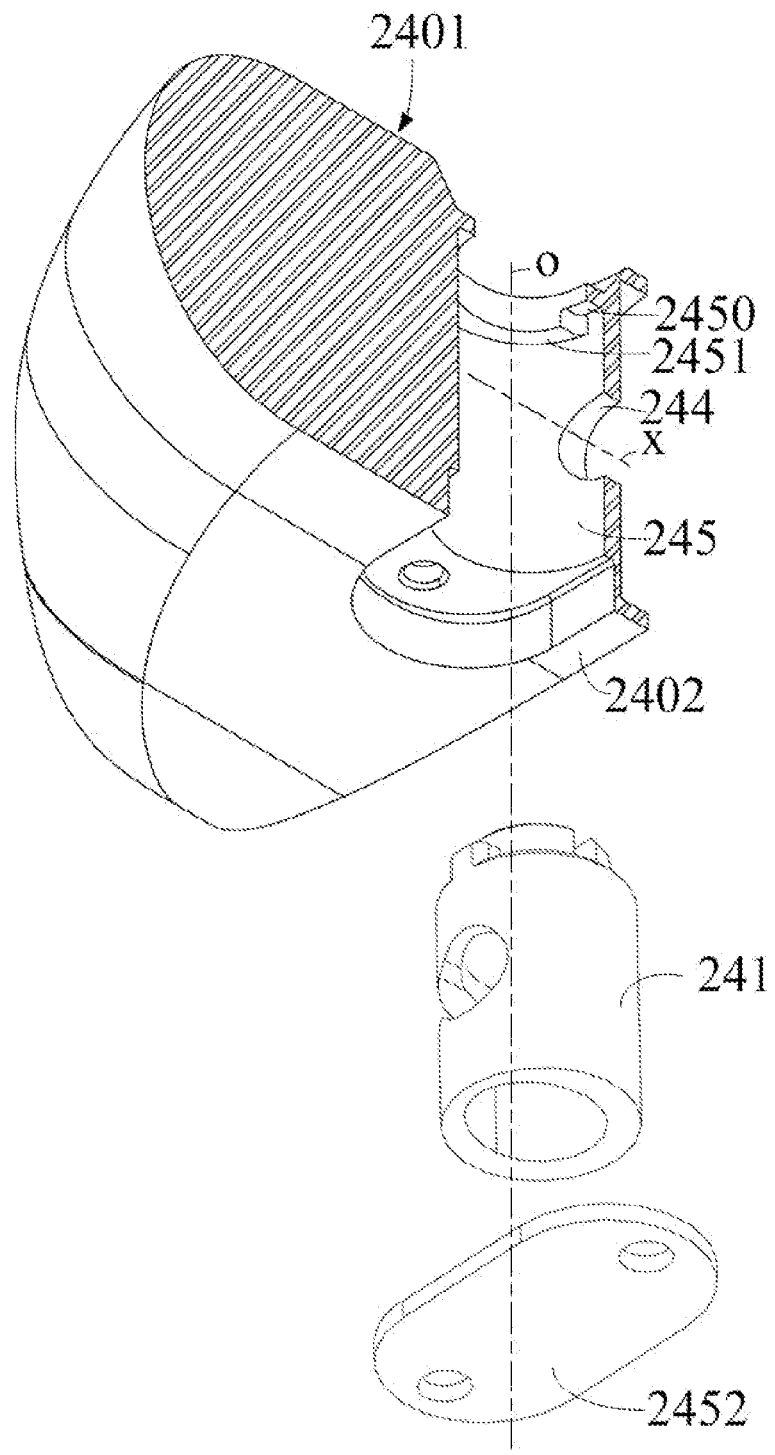
FIG. 13 is a cross-sectional view of the first assembling portion of the rotor assembly shown in FIG. 12, which mainly shows a rotating hole, an eccentric wheel and a closure cover of the first assembling portion.

Referring to FIG. 13 together, one of the rotating holes 245 is used as an example. The rotating hole 245 includes a rotation axis o, the rotation axis o is set perpendicular to the pitch axis direction x and the rotating hole 245 is in communication with a corresponding connecting hole 244. The rotating hole 245 extends from the first side surface 2401 to the second side surface 2402. A hole wall of the rotating hole 245 includes an annular stopper portion 2450 protruding close to the first side surface 2401. The annular stopper portion 2450 is disposed around the rotation axis o and includes an arc-shaped bump 2451 protruding toward the second side surface 2402. The arc-shaped bump 2451 is disposed around the rotation axis o. An opening of the rotating hole 245 on the second side surface 2402 is closed by a closure plate 2452. The closure plate 2452 may be fixed on the second side surface 2402 by using a threaded fastener.

Figure 14:
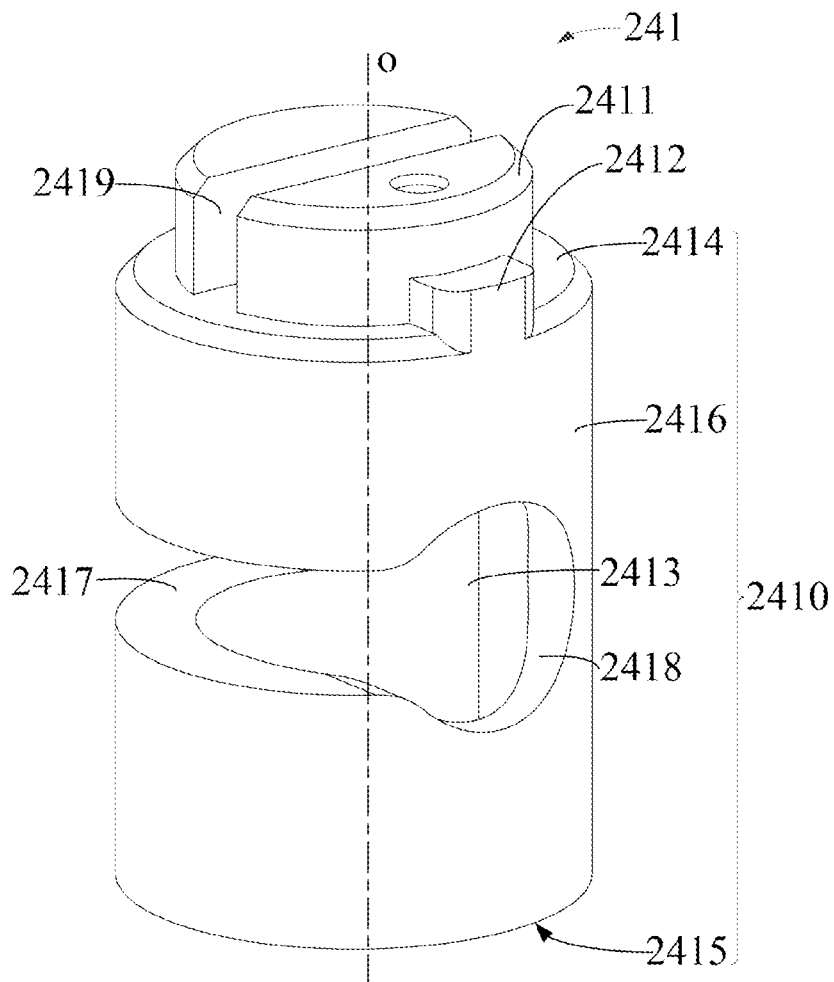
FIG. 14 is a schematic structural diagram of the eccentric wheel shown in FIG. 13.

Referring to FIG. 14 together, a quantity of eccentric wheels 241 corresponds to the quantity of rotating holes 245. Each eccentric wheel 241 is mounted in a corresponding rotating hole 245 for locking a corresponding connecting rod 181. Using an eccentric wheel 241 as an example, the eccentric wheel 241 includes a rotating wheel 2410, a boss 2411 and an interference portion 2412. The rotating wheel 2410 is disposed around the rotation axis o. A cavity 2413 is formed in the rotating wheel 2410 and used for accommodating the limiting body 1812. The rotating wheel 2410 includes a first end surface 2414, a second end surface 2415 and a cylindrical surface 2416. The first end surface 2414 is opposite to the second end surface 2415. The cylindrical surface 2416 is disposed around the rotation axis o and is connected between the first end surface 2414 and the second end surface 2415. An arc-shaped guide groove 2417 and an avoidance groove 2418 are formed on the cylindrical surface 2416. The arc-shaped guide groove 2417 is in communication with the cavity 2413 and is provided around the rotation axis o. The arc-shaped guide groove 2417 includes a first end and a second end. The arc-shaped guide groove 2417 is configured for the rod body 1811 to rotate along the arc-shaped guide groove 2417 around the rotation axis o and is configured to prevent the limiting body 1812 from moving in the pitch axis direction x. The avoidance groove 2418 is in communication with the cavity 2413 and a first end of the arc-shaped guide groove 2417. The avoidance groove 2418 is configured for the limiting body 1812 to pass through. The boss 2411 is formed in the center of the first end surface 2414. A groove 2419 configured to be screwed by a screwdriver is formed on a surface of the boss 2411 facing away from the first end surface 2414. The groove 2419 is, for example, a straight line groove, a cross groove, a Torx groove or a hexagon socket groove and is a straight line groove in the figure. The boss 2411 includes an interference portion 2412 protruding in a direction perpendicular to the rotation axis o.

A process of mounting the eccentric wheel 241 on the rotating hole 245 is described below.

The eccentric wheel 241 is inserted into the rotating hole 245 after the first end surface 2414 of the rotating wheel 2410 is aligned with an opening of the rotating hole 245 provided on the second side surface 2402. After the eccentric wheel 241 is fully inserted into the rotating hole 245, first, the first end surface 2414 of the rotating wheel 2410 abuts against the arc-shaped bump 2451 and/or the interference portion 2412 abuts against the annular stopper portion 2450; secondly, the cylindrical surface 2416 is sleeved on the hole wall of the rotating hole 245; thirdly, the connecting hole 244 in communication with the rotating hole 245 is aligned with the arc-shaped guide groove 2417 or the avoidance groove 2418; and fourthly, the boss 2411 is exposed from an opening of the rotating hole 245 provided on the first side surface 2401. Then, the closure plate 2452 is mounted on the second side surface 2402. The closure plate 2452 abuts against the second end surface 2415 of the rotating wheel 2410 after the closure plate 2452 is mounted on the second side surface 2402. In this case, the eccentric wheel 241 is mounted on the rotating hole 245.

After the eccentric wheel 241 is mounted on the rotating hole 245, the eccentric wheel 241 may only be rotated around the rotation axis o between a first rotation position and a second rotation position in the rotating hole 245. An assembling relationship between the eccentric wheel 241 and the rotating hole 245 is described below to explain why the eccentric wheel 241 may only be rotated around the rotation axis o between the first rotation position and the second rotation position in the rotating hole 245.

The first end surface 2414 of the rotating wheel 2410 abuts against the arc-shaped bump 2451 and/or the interference portion 2412 abuts against the annular stopper portion 2450; and the second end surface 2415 of the rotating wheel 2410 abuts against the closure plate 2452, so that degrees of freedom except two degrees of freedom of moving the eccentric wheel 241 in the direction perpendicular to the rotation axis o and one degree of freedom of rotating around the rotation axis o are limited. In addition, the cylindrical surface 2416 of the rotating wheel 2410 is sleeved on the hole wall of the rotating hole 245, so that the two degrees of freedom of moving the eccentric wheel 241 in the direction perpendicular to the rotation axis o are further limited. In addition, when the eccentric wheel 241 is rotated around the rotation axis o, the arc-shaped bump 2451 will stop the interference portion 2412 to prevent the eccentric wheel 241 from continuing to rotate. Based on the above, the eccentric wheel 241 may only be rotated around the rotation axis o between the first rotation position and the second rotation position in the rotating hole 245. When the eccentric wheel 241 is rotated to the first rotation position, the interference portion 2412 abuts against an end of the arc-shaped bump 2451 and the avoidance groove 2418 is aligned with the connecting hole 244. When the eccentric wheel 241 is rotated to the second rotation position, the interference portion 2412 abuts against an other end of the arc-shaped bump 2451 and a second end of the arc-shaped guide groove 2417 is aligned with the connecting hole 244.

How to connect the rotor assembly 20 to the airframe 10 is described below.

The first mounting portion is connected to the first assembling portion. The positioning beam 182 is aligned with and inserted into the positioning hole 243. When the positioning beam 182 is fully inserted into the positioning hole 243, first, each connecting rod 181 is automatically aligned with and inserted into a corresponding connecting hole 244; and secondly, the first plug-connection terminal 183 is automatically aligned with and plug-connected to the second plug-connection terminal 242.

When the connecting rod 181 is inserted into the connecting hole 244, the eccentric wheel 241 is rotated to the first rotation position and the avoidance groove 2418 of the eccentric wheel 241 is aligned with the connecting hole 244. The limiting body 1812 of the connecting rod 181 sequentially passes through the connecting hole 244 and the avoidance groove 2418. After the connecting rod 181 is fully inserted into the connecting hole 244, the limiting body 1812 of the connecting rod 181 is accommodated in the cavity 2413 of the eccentric wheel 241 and the rod body 1811 of the connecting rod 181 is located in the avoidance groove 2418.

After the positioning beam 182 is fully inserted into the positioning hole 243, first, the each connecting rod 181 is also fully inserted into the corresponding connecting hole 244; secondly, the first plug-connection terminal 183 is also fully plug-connected to the second plug-connection terminal 242; and thirdly, the first mounting surface 1800 is in contact with the first assembling surface 2400. Then, the eccentric wheel 241 is rotated to the second rotation position. The rod body 1811 is located at the second end of the arc-shaped guide groove 2417 of the eccentric wheel 241. In this case, the rotor assembly 20 is connected to the airframe 10.

After the rotor assembly 20 is connected to the airframe 10, the rotor assembly 20 and the airframe 10 are fixed to each other. An assembling relationship between the rotor assembly 20 and the airframe 10 is described below to explain why the rotor assembly 20 and the airframe 10 are fixed to each other.

The positioning beam 182 is inserted into the positioning hole 243, the positioning beam 182 and the positioning hole 243 are matched with each other and a cross-section of the positioning beam 182 is square. Therefore, other degrees of freedom except a degree of freedom of moving the arm component 21 in the pitch axis direction x are limited. In addition, the arc-shaped guide groove 2417 prevents the limiting body 1812 from retreating from the cavity 2413 and cooperates with the first mounting surface 1800 to abut against the first assembling surface 2400, so that the degree of freedom of moving the arm component 21 in the pitch axis direction x is limited.

It may be understood that, the quantity of connecting rods 181 is not limited to 2, which may be set according to an actual condition. For example, if the airframe 10 is lighter or the airframe 10 has less load, the quantity of connecting rods 181 may be smaller, or otherwise, the quantity of connecting rods 181 may be larger.

In some other embodiments, the first assembling portion of the arm component is plug-connected to and is fixed, by using a threaded fastener, to a corresponding first mounting portion.

A specific working process of the multi-rotor unmanned aerial vehicle is as follows:

Two first rotor motors 14 and second rotor motors 23 of two arm components 21, namely a total of four rotor motors, jointly work to provide lift for vertical take-off and landing of the multi-rotor unmanned aerial vehicle. The four rotor motors are differentially controlled to provide the multi-rotor unmanned aerial vehicle with pitch control, roll control, yaw control and omnidirectional flight. In addition, the lower vertical stabilizer 16 may further ensure stable yaw of the multi-rotor unmanned aerial vehicle.

In some embodiments, a size of the first propeller mounted on the first rotor motor 14 is equal to a size of the second propeller mounted on the second rotor motor 23. In actual application, designing the first propeller and the second propeller into propellers in large sizes may ensure vertical take-off and landing of the multi-rotor unmanned aerial vehicle with heavy load.

Figure 15:
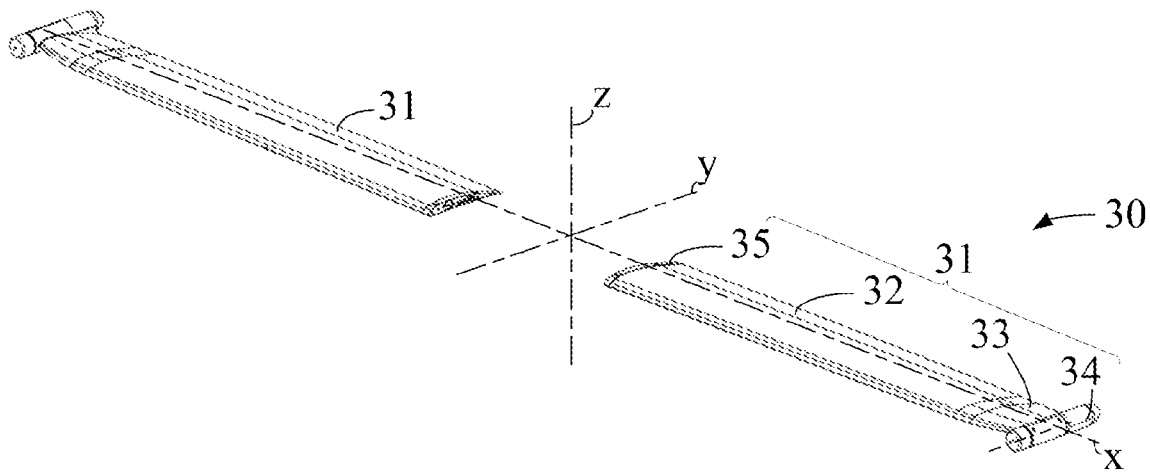
FIG. 15 is a schematic structural diagram of a fixed-wing assembly of the vertical take-off and landing fixed-wing unmanned aerial vehicle shown in FIG. 4, where a third rotor motor of the fixed-wing assembly is located at a first position.
Figure 16:
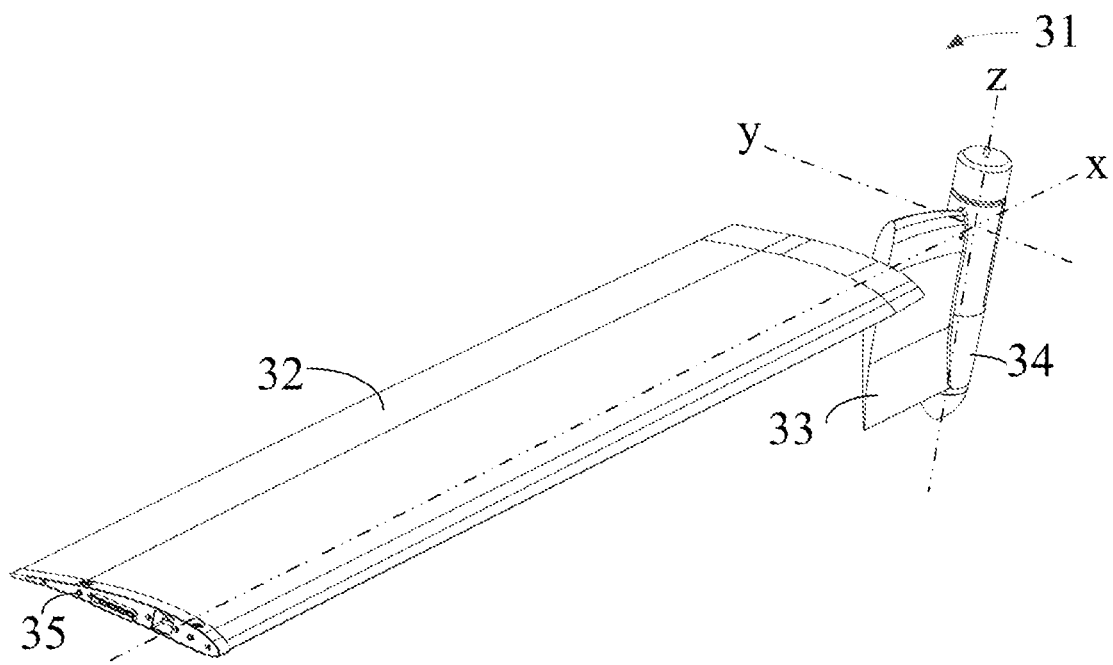
FIG. 16 is a three-dimensional view of one side wing component of the fixed-wing assembly shown in FIG. 15, where the third rotor motor of the side wing component is located at a second position.

Referring to FIG. 15 and FIG. 16, the fixed-wing assembly 30 includes two side wing components 31. Using one of the side wing components 31 as an example, the side wing component 31 includes a side wing body 32, a wingtip 33, a third rotor motor 34, a tilt motor (not shown in the figure) and a second assembling portion 35. The side wing body 32 extends in the pitch axis direction x. One end of the side wing body 32 is connected to the wingtip 33 and an other end of the side wing body 32 is connected to the second assembling portion 35. The tilt motor is mounted on the side wing body 32 and is connected to the wingtip 33. The third rotor motor 34 is mounted on the wingtip 33. The wingtip 33 is rotatable relative to the side wing body 32 around the pitch axis direction x, so that the third rotor motor 34 mounted on the wingtip 33 is rotatable between a first tilt position and a second tilt position around the pitch axis direction x. The tilt motor is configured to drive the wingtip 33 to rotate around the pitch axis direction x.

As shown in FIG. 15, when the third rotor motor 34 is tilted to the first tilt position, the wingtip 33 is substantially level with the side wing body 32. As shown in FIG. 16, when the third rotor motor 34 is tilted to the second tilt position, the wingtip 33 is substantially orthogonal to the side wing body 32.

A rotary shaft of the third rotor motor 34 is disposed perpendicular to the pitch axis direction x and a third propeller (not shown in the figure) is mounted on the rotary shaft of the third rotor motor 34. When the third rotor motor 34 is tilted to the first tilt position, the rotary shaft of the third rotor motor 34 is substantially rotated in the roll axis direction y to provide thrust. When the third rotor motor 34 is tilted to the second tilt position, the rotary shaft of the third rotor motor 34 is substantially rotated in the yaw axis direction z to provide lift.

The second assembling portion 35 is configured to be connected to a corresponding first mounting portion 18. A structure of the second assembling portion 35 is similar to a structure of the first assembling portion 24. To be specific, either of the second assembling portion 35 and the first assembling portion 24 includes a first assembling body 240, eccentric wheels 241 and a second plug-connection terminal 242. For the structure of the first assembling portion 24, reference may be made to FIG. 12 again and details will not be repeated herein. The second plug-connection terminal 242 of the side wing component 31 is electrically connected to the tilt motor and the third rotor motor 34.

How to connect the fixed-wing assembly 30 to the airframe 10 is described below.

The first mounting portion is connected to the second assembling portion. A process of mounting the second assembling portion on the first mounting portion is similar to the process of mounting the first assembling portion on the first mounting portion because structures of the second assembling portion and the first assembling portion are similar. Details will not be repeated herein.

Figure 17:
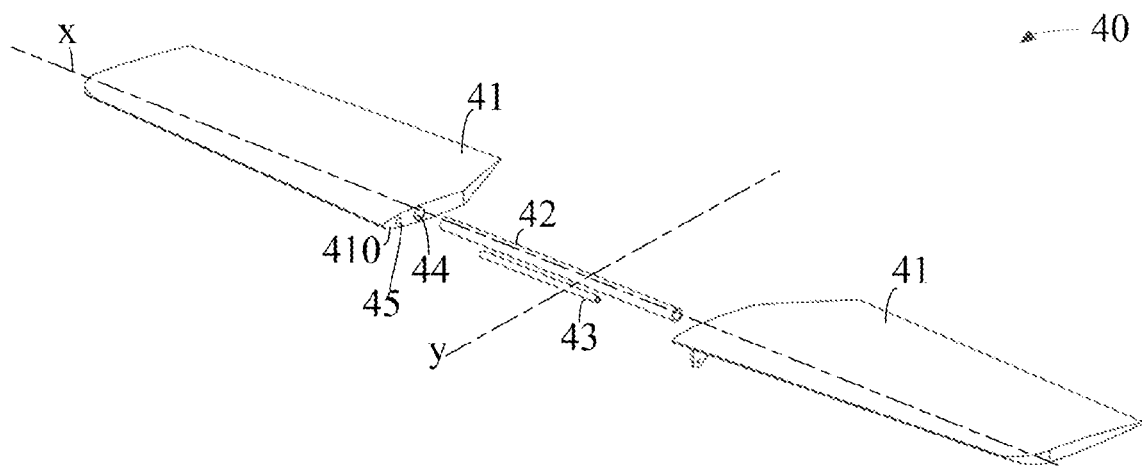
FIG. 17 is a schematic structural diagram of a tail wing assembly of the vertical take-off and landing fixed-wing unmanned aerial vehicle shown in FIG. 4.

Referring to FIG. 17 together, the tail wing assembly 40 includes tail wing components 41, a rotary shaft 42 and a transmission shaft 43. A quantity of tail wing components 41 corresponds to a quantity of second mounting portions 19. One of the tail wing components 41 is used as an example. The tail wing component 41 includes a second assembling surface 410. The second assembling surface 410 is disposed substantially perpendicular to the pitch axis direction x. A first plug-connection hole 44 and a second plug-connection hole 45 are formed on the second assembling surface 410. Both the first plug-connection hole 44 and the second plug-connection hole 45 are provided in the pitch axis direction x and are respectively configured to be plug-connected to an end of the rotary shaft 42 and an end of the transmission shaft 43.

A process of connecting the tail wing assembly 40 to the airframe 10 is described below.

The rotary shaft 42 is inserted into the shaft hole 191 and has two ends both exposed outside the shaft hole 191. In addition, the transmission shaft 43 is inserted into the arc-shaped guide hole 192 and has two ends both exposed outside the arc-shaped guide hole 192. After the rotary shaft 42 and the transmission shaft 43 are mounted, the first plug-connection hole 44 of each tail wing component 41 is configured to be inserted by an end of a corresponding rotary shaft 42; and further, the second plug-connection hole 45 of the each tail wing component 41 is configured to be inserted by an end of a corresponding transmission shaft 43. The second assembling surface 410 of the each tail wing component 41 is in contact with a second mounting surface 190 of a corresponding second mounting portion 19 after the first plug-connection hole 44 of the each tail wing component 41 is fully inserted by the end of the corresponding rotary shaft 42 and the second plug-connection hole 45 of the each tail wing component 41 is fully inserted by the end of the corresponding transmission shaft 43. In this case, the tail wing assembly 40 is connected to the airframe 10.

After the tail wing assembly 40 is connected to the airframe 10, the transmission shaft 43 is rotated along the arc-shaped guide hole 192 around the pitch axis direction x to drive two tail wing components 41 to rotate around the rotary shaft 42. In some embodiments, a drive motor (not shown in the figure) configured to drive the transmission shaft 43 to rotate around the pitch axis direction x is disposed in the lower vertical stabilizer 16. The drive motor is connected to the transmission shaft 43 by using a transmission mechanism such as a connecting rod.

A specific working process of the vertical take-off and landing fixed-wing unmanned aerial vehicle is as follows:

During vertical take-off and landing, two first rotor motors 14 provide lift and pitch control. Third rotor motors 34 of two side wing components 31 are tilted to the second tilt position to provide auxiliary lift. The third rotor motors 34 of the two side wing components 31 are differentially controlled and tilt motors of the two side wing components 31 are tilted and differentially controlled to provide roll control and yaw control.

During enduring flight, the two first rotor motors 14 stop working, side wing bodies 32 of the two side wing components 31 provide lift and two tail wing components 41 provide pitch control. The third rotor motors 34 of the two side wing components 31 are tilted to the first tilt position to provide thrust. The third rotor motors 34 of the two side wing components 31 are differentially controlled and tilt motors of the two side wing components 31 are tilted and differentially controlled to provide roll control and yaw control.

Compared with the prior art, in the unmanned aerial vehicle 100 provided in the embodiments of the present application, eccentric wheels are disposed on the power assembly and connecting rods are disposed on the airframe. The connecting rod is insertable into the eccentric wheel in the pitch axis direction when the eccentric wheel is rotated to the first rotation position; and the connecting rod is non-retreatable from the eccentric wheel in the pitch axis direction when the eccentric wheel is rotated to the second rotation position and the connecting rod is inserted into the eccentric wheel, so that the connecting rod is locked. After the connecting rod is inserted into the eccentric wheel, the connecting rod may be locked only by rotating the eccentric wheel, thereby implementing the unmanned aerial vehicle in which the power assembly can be conveniently detached from the airframe.

In addition, the fixed-wing assembly and the rotor assembly are replaceably connected to the airframe, the fixed-wing assembly is connected to the airframe to form the vertical take-off and landing fixed-wing unmanned aerial vehicle and the rotor assembly is connected to the airframe to form the multi-rotor unmanned aerial vehicle, thereby implementing an unmanned aerial vehicle that can switch between the vertical take-off and landing fixed-wing unmanned aerial vehicle and the multi-rotor unmanned aerial vehicle.

Finally, it should be noted that the foregoing embodiments are merely used for describing technical solutions of the present application, but are not intended to limit the present application. Under the concept of the present application, the technical features in the foregoing embodiments or different embodiments may be combined, the steps may be implemented in any sequence, and there may be many other changes in different aspects of the present application. For brevity, those are not provided in detail. Although the present application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. An unmanned aerial vehicle, comprising:
an airframe, comprising first mounting portions, wherein the first mounting portion comprises a first mounting body and connecting rods formed on the first mounting body, the connecting rods extending in a pitch axis direction; and a power assembly, comprising a first assembling body and eccentric wheels mounted on the first assembling body, wherein the eccentric wheel is rotatable between a first rotation position and a second rotation position of the first assembling body around a rotation axis of the first assembling body, the rotation axis being perpendicular to the pitch axis direction, wherein the connecting rod is insertable into the eccentric wheel in the pitch axis direction when the eccentric wheel is rotated to the first rotation position; and the connecting rod is non-retractable from the eccentric wheel in the pitch axis direction when the eccentric wheel is rotated to the second rotation position and the connecting rod is inserted into the eccentric wheel;

a tail wing assembly, the tail wing assembly removably mounted to the airframe, and the tail wing assembly is rotatable around the pitch axis direction.

2. The unmanned aerial vehicle according to claim 1, wherein the first mounting body comprises a first mounting surface, the connecting rods being formed on the first mounting surface;

the first assembling body comprises a first assembling surface and a first side surface that are connected to each other, wherein the first assembling surface is configured to be attached to the first mounting surface and connecting holes are formed on the first assembling surface, the connecting holes being configured to be inserted by the connecting rods; and rotating holes are formed on the first side surface, the rotating holes comprising a rotation axis and being in communication with the connecting holes; and the eccentric wheel is mounted in the rotating hole.

3. The unmanned aerial vehicle according to claim 2, wherein the connecting rod comprises a rod body and a limiting body;

the rod body extends in the pitch axis direction, the limiting body is connected to an end of the rod body far away from the first mounting body and a cross-section size of the rod body is less than a cross-section size of the limiting body;

the eccentric wheel comprises a rotating wheel, wherein a cavity is formed in the rotating wheel and the rotating wheel comprises a cylindrical surface disposed around the rotation axis, the cylindrical surface being sleeved on a hole wall of the rotating hole; and an arc-shaped guide groove and an avoidance groove are formed on the cylindrical surface, the arc-shaped guide groove being in communication with the cavity and provided around the rotation axis, the arc-shaped guide groove comprising a first end and a second end, the avoidance groove being in communication with the cavity and the first end;

when the eccentric wheel is rotated to the first rotation position, the avoidance groove is aligned with the connecting hole and the limiting body is accommodatable in the cavity through the connecting hole in the pitch axis direction; and when the eccentric wheel is rotated to the second rotation position and the limiting body is accommodated in the cavity, the second end is aligned with the connecting hole and the limiting body is non-retractable from the cavity through the arc-shaped guide groove in the pitch axis direction.

4. The unmanned aerial vehicle according to claim 3, wherein the limiting body is spherical.

5. The unmanned aerial vehicle according to claim 3, wherein the first assembling body further comprises a second side surface, the first side surface being opposite to the second side surface, the first assembling surface being connected between the first side surface and the second side surface; the rotating hole extends from the first side surface to the second side surface and an opening of the rotating hole on the second side surface is closed by a closure plate, the closure plate being detachably connected to the second side surface; and the hole wall of the rotating hole comprises an annular stopper portion protruding close to the first side surface, the annular stopper portion being disposed around the rotation axis.

6. The unmanned aerial vehicle according to claim 5, wherein the rotating wheel further comprises a first end surface and a second end surface opposite to each other, the cylindrical surface being connected between the first end surface and the second end surface, the first end surface abutting against the annular stopper portion and the second end surface abutting against the closure plate.

7. The unmanned aerial vehicle according to claim 6, wherein the eccentric wheel further comprises a boss; and the boss is formed in the center of the first end surface and is exposed from the rotating hole, a groove configured to be screwed by a screwdriver being formed on a surface of the boss facing away from the first end surface.

8. The unmanned aerial vehicle according to claim 7, wherein an arc-shaped bump is formed on the annular stopper portion toward the first end surface;

the eccentric wheel further comprises an interference portion, the interference portion being formed on the boss in a direction perpendicular to the rotation axis;

the first end surface abuts against the annular stopper portion by using the arc-shaped bump;

the interference portion abuts against an end of the arc-shaped bump when the eccentric wheel is rotated to the first rotation position; and the interference portion abuts against an other end of the arc-shaped bump when the eccentric wheel is rotated to the second rotation position.

9. The unmanned aerial vehicle according to claim 2, wherein a positioning beam is further formed on the first mounting surface, the positioning beam extending in the pitch axis direction; and a positioning hole is further formed on the first assembling surface, the positioning hole being configured to be inserted by the positioning beam.

10. The unmanned aerial vehicle according to claim 9, wherein a cross-section of the positioning beam is non-circular.

11. The unmanned aerial vehicle according to claim 10, wherein the cross-section of the positioning beam is square.

12. The unmanned aerial vehicle according to claim 2, wherein a first plug-connection terminal is disposed on the first mounting surface; and a second plug-connection terminal is disposed on the first assembling surface and is configured to be plug-connected to the first plug-connection terminal.

13. The unmanned aerial vehicle according to claim 1, wherein the power assembly comprises a fixed-wing assembly and a rotor assembly;

the fixed-wing assembly and the rotor assembly are replaceable connected to the first mounting portion;

the airframe and the fixed-wing assembly jointly form a vertical take-off and landing fixed-wing unmanned aerial vehicle when the fixed-wing assembly is connected to the first mounting portion;

the airframe and the rotor assembly jointly form a multi-rotor unmanned aerial vehicle when the rotor assembly is connected to the first mounting portion; and either of the fixed-wing assembly and the rotor assembly comprises the first assembling body and the eccentric wheels.

* * * * *